United States Patent
Yoshizako et al.

(10) Patent No.: US 6,227,350 B1
(45) Date of Patent: May 8, 2001

(54) BELT CLEANER

(75) Inventors: Kageyoshi Yoshizako; Masahiro Uchida, both of Sakai; Nobuyoshi Fujisaki, Osaka, all of (JP)

(73) Assignee: Nippon Tsusho Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/577,668

(22) Filed: May 25, 2000

(30) Foreign Application Priority Data

Jun. 28, 1999 (JP) .................................................. 11-181412

(51) Int. Cl.$^7$ .................................................. B65G 45/16
(52) U.S. Cl. .......................................... 198/499; 15/256.5
(58) Field of Search ................................ 198/499, 256.5; 15/256.5

(56) References Cited

U.S. PATENT DOCUMENTS

| | | | |
|---|---|---|---|
| 3,841,470 | 10/1974 | Meguro . | |
| 4,269,301 | * 5/1981 | Gibbs ................................. | 198/499 |
| 4,825,997 | * 5/1989 | Bowman et al. ..................... | 198/499 |
| 4,836,356 | * 6/1989 | Mukai et al. ........................ | 198/499 |
| 4,936,439 | * 6/1990 | Alexander, Jr. et al. ............ | 198/499 |
| 5,007,524 | * 4/1991 | Morefield ............................ | 198/499 |
| 5,121,829 | * 6/1992 | Grannes et al. .................... | 198/495 |
| 5,213,197 | * 5/1993 | Mohri .................................. | 198/499 |
| 5,222,588 | * 6/1993 | Gordon ............................... | 198/499 |
| 5,248,026 | * 9/1993 | Morefield ............................ | 198/499 |
| 5,722,528 | * 3/1998 | Dolan ................................. | 198/499 |
| 5,799,776 | * 9/1998 | Dolan ................................. | 198/499 |
| 6,041,913 | * 6/1998 | Dolan ................................. | 198/499 |

FOREIGN PATENT DOCUMENTS

| | | |
|---|---|---|
| 56-103516 | 1/1955 | (JP) . |
| 4-292320 | 10/1992 | (JP) . |
| 7-41146 | 2/1995 | (JP) . |

* cited by examiner

*Primary Examiner*—Christopher P. Ellis
*Assistant Examiner*—Rashmi Sharma
(74) *Attorney, Agent, or Firm*—Nixon Peabody LLP; David S. Safran

(57) ABSTRACT

A belt cleaner is provided in which scraping portions of scrapers are constantly pressed against a surface of a conveyor belt with uniform force throughout all cleaner units. The belt cleaner includes an array of the plurality of the cleaner units arranged in the transverse direction of the conveyor belt, and a pressure generator for combined with the cleaner units. The pressure generator includes respective support sections which are engaged with corresponding working portions of the scrapers of the cleaner units to integrally move with the forward and backward motion of the scrapers with respect to the belt surface, a pressure passage for causing the support sections to communicate with each other, and a fluid completely filled in the pressure passage.

7 Claims, 5 Drawing Sheets

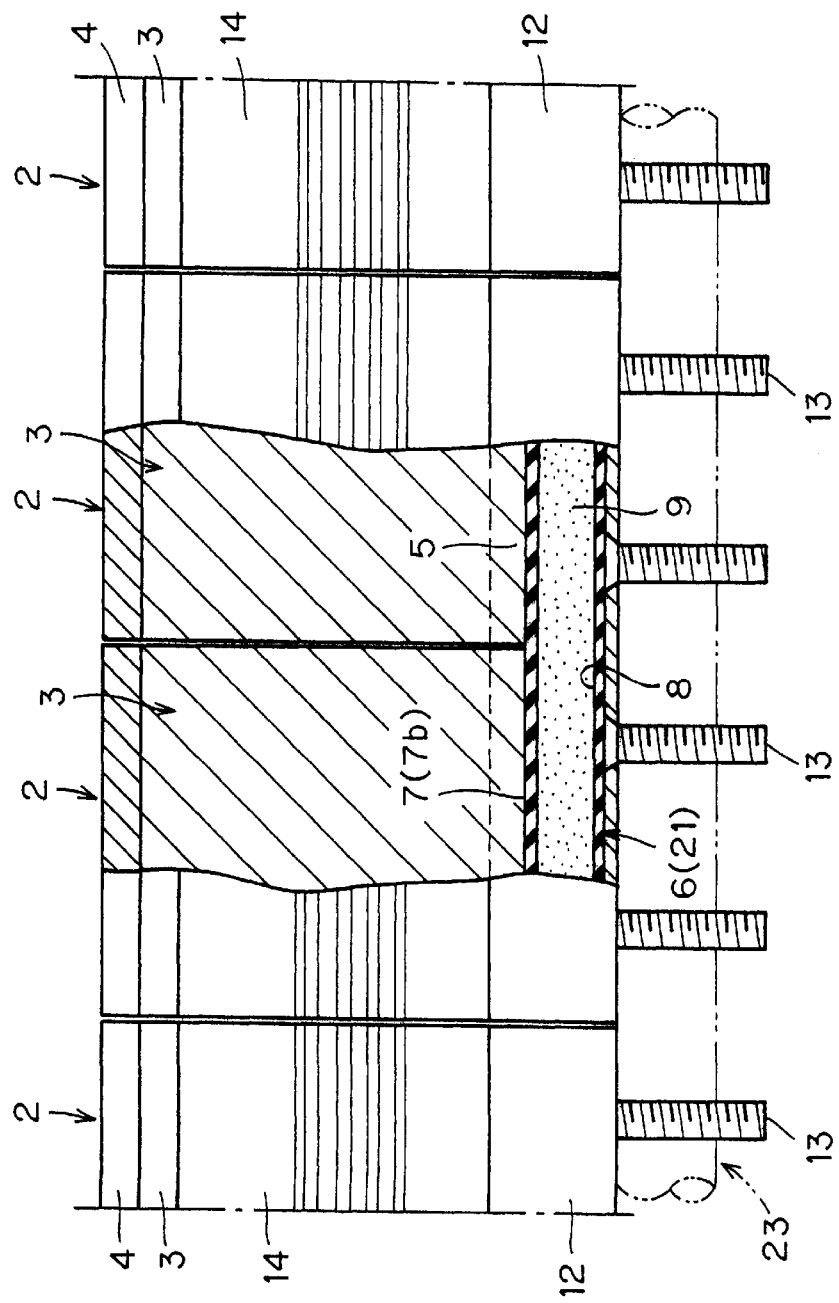

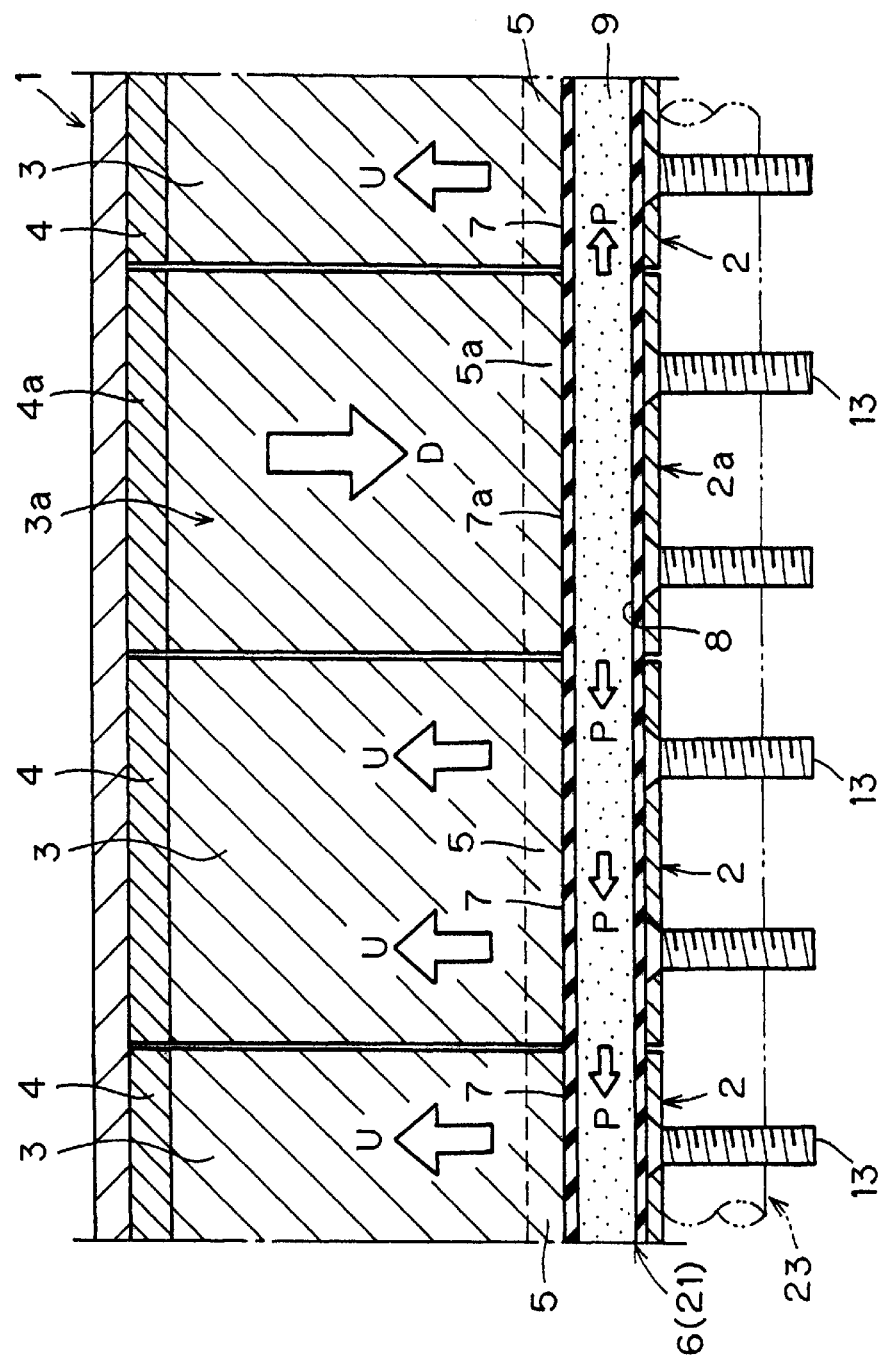

BELT CLEANER

FIELD OF THE INVENTION

The present invention relates to a belt cleaner for removing the leavings of conveying materials, such as coke, stuck on the surface of a conveyor belt on a return path of the belt.

BACKGROUND OF THE INVENTION

A typical conveyor belt is fitted for running in a circle between a drive pulley and an idler pulley in an endless fashion. The belt conveys a conveying material in a forward direction, discharges the conveying material, and then returns on the pulley in a backward direction opposite to the forward direction. In this specification, a "forward path" refers to one portion of the travel of the conveyor belt through which the belt conveys the conveying material until discharging the material therefrom, and a "return path" refers to the rest portion of the travel through which the belt returns subsequent to the dropping of the conveying material. The return path thus includes a passage on the pulley immediately subsequent to a point of return.

Leavings remain stuck on the surface of the conveyor belt even after the dropping of the conveying material at the point of return, and a belt cleaner is thus arranged to remove the leavings stuck on the belt on the return path. As disclosed in U.S. Pat. No. 3,841,470, a conventional belt cleaner includes a plurality of cleaner units arranged in the transverse direction of the conveyor belt on the return path of the belt. These cleaner units are arranged on a support frame and are composed of scraping portions aligned in a line across the width of the belt on the return path and maintained in contact with the belt surface. Each cleaner unit has a scraper with a scraping portion having a tip on the top end thereof and a resilient member formed such as a rubber block for supporting the scraper. The cleaner units are adjusted for a vertical shift by the support frame so that the scraping portions on the top are aligned at the same level in height. By raising the support frame, the scraping portions are brought into contact with the belt surface by the resilient deformation of the resilient member and thereby scrape the leavings off the belt surface.

The leavings on the belt surface have irregular shapes such as wavy shapes, rather than having flat surfaces, and such irregularities appear not only in the longitudinal direction of the belt but also in the transverse direction of the belt. Since each cleaner unit resiliently supports its scraper by the corresponding resilient member as already discussed, each scraper may recede or advance independently between the cleaner units, following the irregularity of the leavings and thereby scraping the leavings off. When the irregularity of the leavings is large in height, or when the leavings are rigid at the peak thereof, the scraper in the course of scraping action recedes by means of the resilient member and passes over the peak. At the same time, the belt jumps or vibrates to recede from the scraper. When the belt vibrates in this way, the belt along the entire width thereof tends to lift from the scraper and the scraper's effect of scraping the leavings reduces in performance. Specifically, the pressing force of the scraper increases against the belt surface at the peaks of the leavings, while the pressing forces of the other scrapers in the rest of the belt surface weaken. The scraping portions of the linearly aligned scrapers fail to be pressed in uniform pressure against the belt surface, thereby causing non-uniformity in the scraping effect to the leavings in the transverse direction of the belt.

To reliably convey the conveying material thereon, the conveyor belt is generally supported by guide pulleys, arranged in a "trough" angle maintained with each other, so that the belt becomes arcuate in cross section. The leavings on the belt surface are thus large in the central portion of the belt and become smaller near at it goes to both sides of the belt, and the amount of leavings to be scraped by the scrapers is varied accordingly. For this reason, the linearly aligned scrapers wear more on the central scraping portions thereof than on the distal scraping portions thereof, thereby suffering from a biased abrasion. Since the resilient force of the resilient member exerting on the scraper varies in response to the amount of wear of the scraping portion (i.e., the more amount of wear, the less the resilient force of the scraping portion becomes), there occurs a difference in the pressure of the scraping portions against the belt surface between the array of scrapers subsequent to the creation of the biased abrasion. In other words, the scraping portions of the linearly aligned scrapers are unable to press against the belt surface in uniform pressure, and the scraping effect to the leavings is subject to non-uniformity across the width of the belt.

As a result of the conveyance operation of the conveyor belt and the scraping action by the belt cleaner, the conveyor belt itself suffers from wear on the belt surface. Also the conveyor belt is subject to a deformed shape due to its acquired "trough shaping habit" as mentioned above. In the conventional belt cleaner, the linearly aligned scrapers are not always uniformly pressed against the belt surface, thereby failing to achieve a uniform scraping effect across the width of the belt.

SUMMARY OF THE INVENTION

It is an object of the present invention to provide a belt cleaner which resolves those problems mentioned above.

A belt cleaner of the present invention in one aspect includes a plurality of cleaner units to be arranged in an array in the transverse direction of a conveyor belt on a vertically movable support frame, and a pressure generator combined with the plurality of the cleaner units. Each of the cleaner units includes a scraper supported movable in the direction of forward and backward with respect to the surface of the conveyor belt. The scraper includes a scraping portion at its top end which is brought into contact with the belt surface, and a working portion at its bottom end. The pressure generator includes a plurality of support sections which are respectively engaged with the working portions of the scrapers to integrally move with the forward and backward motion of the scrapers, a pressure passage for causing the support sections to communicate with each other, and a fluid filled in the pressure passage. The pressure passage is enclosed with the fluid filled, and when the inner pressure of the pressure passage is increased with one support portion being pressed by the corresponding working portion of the scraper, the other support sections push up the corresponding working portions of the corresponding scrapers.

In a preferred embodiment, each of the cleaner units may include a resilient member for resiliently supporting the scraper toward the belt surface. The resilient member provides a socket under the working portion so that the array of the cleaner units arranges the sockets extending therethrough. The pressure generator includes an elongated body that extends through the sockets that communicate through the arrayed cleaner units. The elongated body includes the resilient wall extending along the pressure passage filled with the fluid. The resilient wall is resiliently deformable in response to a change in the internal pressure of the pressure passage. The resilient wall is engaged with the working portions of the scrapers of the cleaner units and constitutes the support sections corresponding to the working portions of the scrapers. Each support section is resiliently deformed inwardly in response to the backward motion of the scraper, and is resiliently deformed outwardly upon receipt of an increased pressure of the fluid.

Preferably, the elongated body of the pressure generator has the length substantially equal to the total length of the array of the cleaner units, and the resilient wall is formed by the top wall of the elongated body, while the bottom wall and the side walls of the elongated body are rigid and are not deformed even when the internal pressure changes along the pressure passage. The elongated body is inserted through the sockets of all cleaner units, the resilient wall is engaged with the working portions of the scrapers in the cleaner units.

Preferably, each of the cleaner units includes a pair of diaphragm plates formed of resilient members which clamp the scraper therebetween to resiliently support the scraper in a fashion movable in the direction of forward and backward with respect to the belt surface. The socket is arranged between the pair of the diaphragm plates under the working portion. When the cleaner units are arranged in an array, the sockets communicates with each other to extend through the array.

Preferably, the pair of the diaphragm plates respectively include guide walls having top portions attached to both sides of the scraper and tapered portions inclining gradually apart from each other in the downward direction from the top portions, neck walls which are inwardly curved from the respective guide walls, and foot walls vertically extended from the respective neck walls and secured to a base member. The socket is formed between the pair of foot walls on the base member. The scraper is supported by the resilient deformation of the neck walls in a vertically movable fashion.

Preferably, each cleaner unit is provided with each base member of a channel-like member upwardly opened which includes a bottom base portion to which a mounting bolt is attached, and a pair of channel walls vertically standing from both sides of the base portion. The pair of the foot walls of the cleaner unit are respectively secured to the channel walls.

Preferably, the working portion is constituted by a rail-like member having a semi-circle in cross section which is arranged at the lower end of the scraper. A groove is formed in the top surface of the elongated body so that the resilient wall is constituted by a thin portion having a U-shaped cross section defined by the groove in which the working portion is received.

BRIEF DESCRIPTION OF DRAWINGS

FIG. 4 is a partially exploded cross-sectional view illustrating the embodiment of the present invention; and FIG. 5 is a cross-sectional view showing the operation of the embodiment according to the present invention.

DESCRIPTION OF PREFERRED EMBODIMENTS

Figure 1:
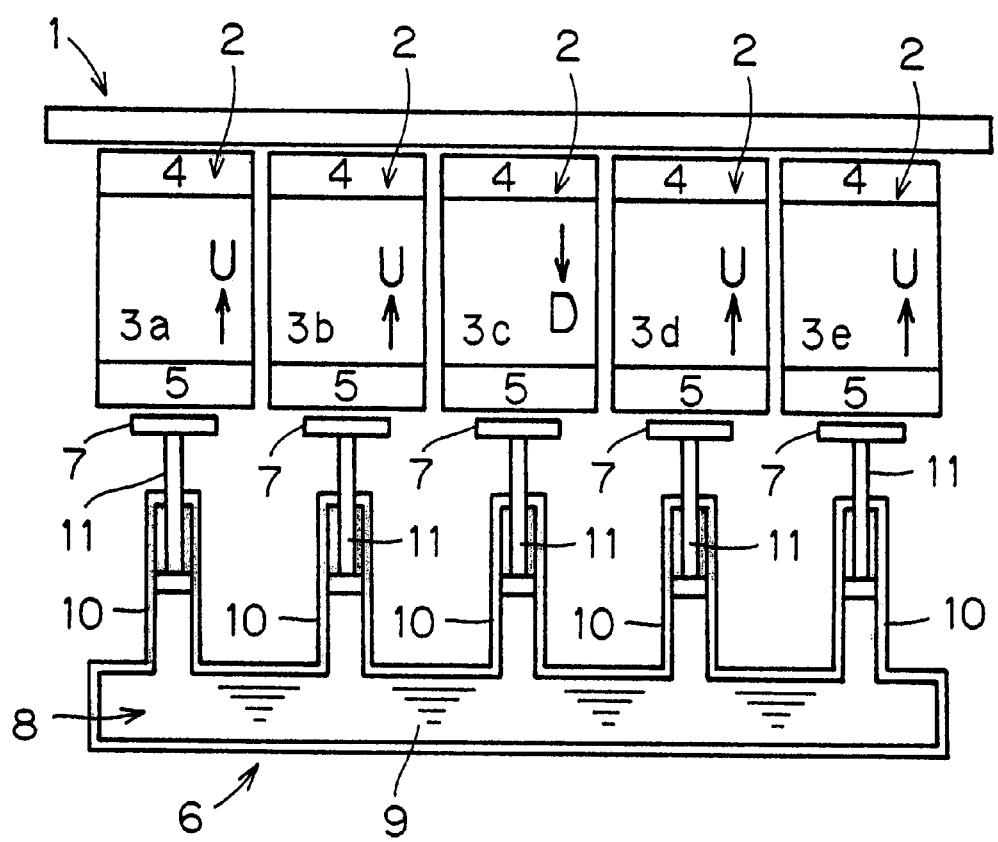
FIG. 1 is a diagrammatic view illustrating the principle of the present invention.
Figure 2:
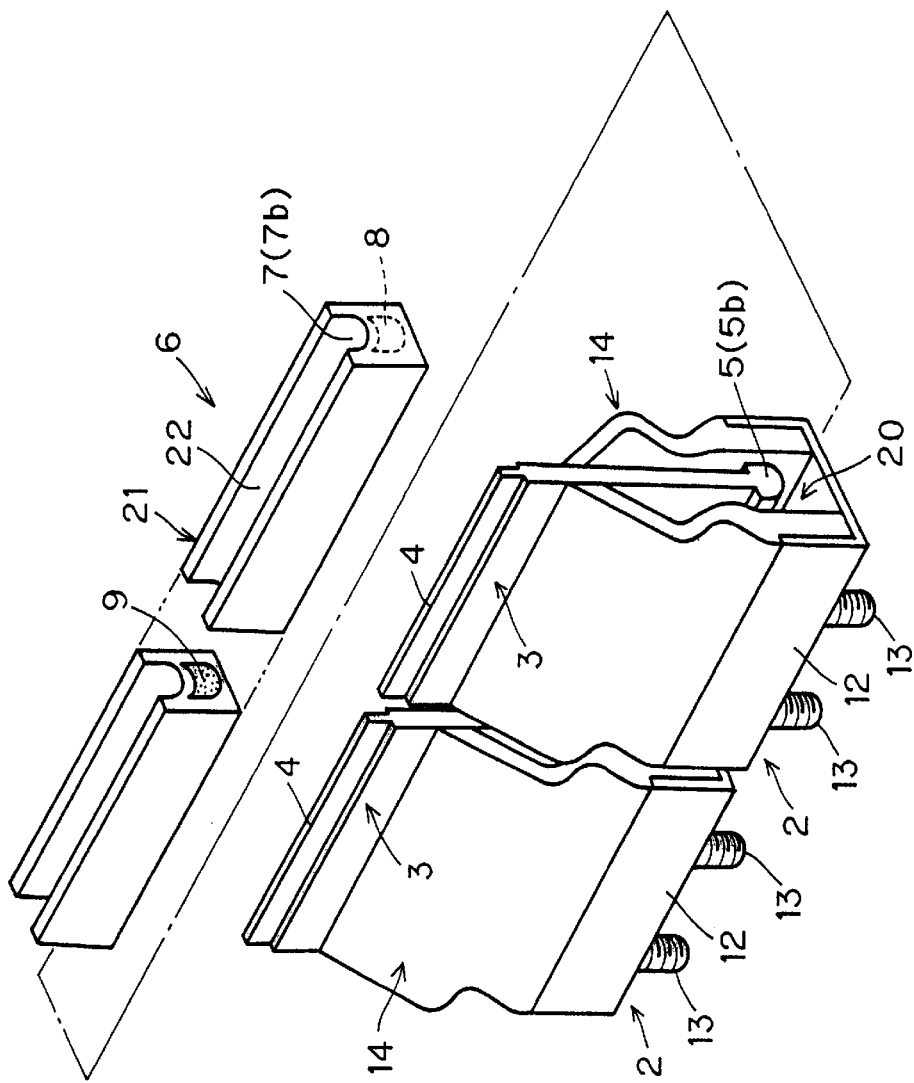
FIG. 2 is a perspective view illustrating an embodiment of cleaner units and a pressure generator according to the present invention.

Preferred embodiments of the present invention are now discussed, referring to the drawings.

(Description of the Principle of the Invention)

FIG. 1 diagrammatically shows the principle of the present invention. An array of a plurality of cleaner units 2 is arranged in the substantially overall width of a conveyor belt 1 positioned on the return path of a belt conveyor apparatus. Each cleaner unit 2 includes a scraper 3 which is movable in the direction of forward and backward with respect to the surface of the conveyor belt 1. Each scraper 3 includes a scraping portion 4 at the top end thereof, and a working portion 5 at the bottom end thereof. The scraping portion 4 is brought into contact with the surface of the conveyor belt 1. Although FIG. 1 shows five scrapers 3a through 3e of five cleaner units 2, the number of cleaner units 2 is not important.

The scrapers 3 of the cleaner units 2 are supported by a pressure generator 6. The pressure generator 6 includes a plurality of support sections 7 which are engaged with the working portions 5 of the scrapers 3. The support sections 7 integrally move along with the recession and advance motion of the scrapers 3 of the cleaner units 2. The pressure generator 6 also includes a pressure passage 8 completely filled with a fluid 9 to allow the support sections 7 to communicate with each other. For easy understanding, FIG. 1 illustrates a plurality of cylinders 10 which are branched off the pressure passage 8 corresponding to the cleaner units 2. The support sections 7 are respectively mounted on pistons 11 inserted into the respective cylinders 10. The fluid 9 may be a liquid such as oil, or a gas such as air, and completely fills the pressure passage 8 including the cylinders 10.

When the pressure generator 6 mounted on a support frame (not shown) is lifted by lifting means, such as a spring or resilient urging means such as a resilient member, the support sections 7 are brought into contact with the respective working portions 5 of the scrapers 3. The scraping portions 4 of the scrapers 3 of all cleaner units 2 come in contact with the surface of the conveyor belt 1. Leavings of a conveying material stuck onto the surface of the conveyor belt 1 in circular motion are thus removed by the array of the scraping portions 4 and then drop downward.

When an external force D in a downward direction is exerted on a centrally located scraper 3c, for instance, the piston 11 is lowered by the working portion 5 pressing the support section 7, thereby increasing the internal pressure of the pressure passage 8. The resulting pressure increase raises the remaining pistons 11 through the fluid 9, thereby applying upward force U to the scrapers 3a, 3b, 3d, and 3e located on both sides of the central scraper 3c.

Among all scrapers 3a through 3e, the pressing force of the scraping portions 4 against the belt surface is thus balanced to be uniform.

(Preferred Embodiments)

FIG. 2 through FIG. 5 show an embodiment in which the belt cleaner of the present invention is implemented to be preferably commercialized. As already discussed, the belt cleaner includes an array of a plurality of cleaner units 2 arranged in the transverse direction of the conveyor belt 1, and the pressure generator 6 combined with the scrapers of the cleaner units 2.

Each cleaner unit 2 includes a mounting bolt 13 rigidly attached to a base portion 12b of a base member 12 that is constructed of a steel channel or the like. The scraper 3, which is supported in a suspended state above the base member 12, includes the scraping portion 4 at the top end thereof, and the working portion 5 at the bottom end thereof. The scraper 3 is formed of a metal plate, such as a steel plate, and the scraping portion 4 is provided by brazing a carbide tip to the top end of the scraper 3. Alternatively, the scraping portion 4 may be formed of the top end portion of the scraper 3 itself. To assure a good engagement of the working portion 5 with the pressure generator 6 in the illustrated embodiment, the working portion 5 is provided by rigidly attaching a rail-like member 5b to the bottom end of the scraper 3, which is thickened than the thickness of the metal plate of the scraper 3 and has a semi-circular cross section. However, the present invention is not limited to this arrangement.

Figure 3:
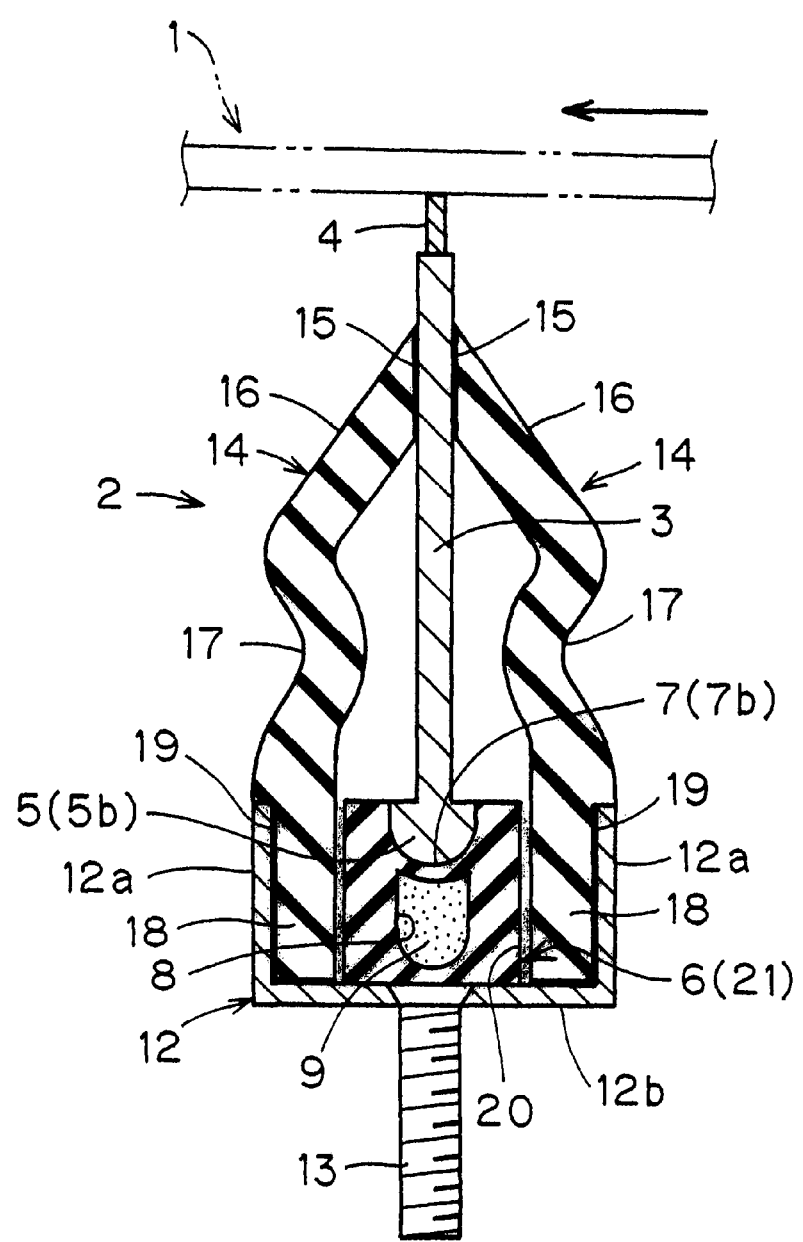
FIG. 3 is an elevational cross-sectional view of the embodiment of the present invention.

The scraper 3 is supported in a suspended state by a pair of diaphragm plates 14 constructed of a resilient material such as rubber. Referring to FIG. 3, the pair of the diaphragm plates 14 arranged to clamp the scraper 3 have attaching portions 15 secured to both sides of the top of the scraper 3 by means of vulcanized bonding or the like. The diaphragm plates 14 integrally include guide walls 16 tapered by inclining gradually apart from each other as they run downward from the attaching portions 15, neck walls 17 that are inwardly curved from the respective guide walls 16, and foot walls 18 that downwardly extend from the respective neck walls 17 and are inserted inside channel walls 12a of the base member 12. The foot portions 18 are secured to the inside surfaces of the channel walls 12a at securing portions 19 by means of vulcanized bonding or the like. The scraper 3 is thus vertically movable while being supported, and the diaphragm plates 14 then resiliently deform the neck walls 17.

The cleaner unit 2 includes a hollow space below the working portion 5 of the scraper 3, defined by the foot portions 18 and a bottom wall 12b of the base member 12. The space forms a socket 20 that is opened in the transverse direction of the cleaner unit 2 (i.e., the direction of the array of the cleaner units 2). The sockets 20 are thus extended in the transverse direction through the array of the cleaner units 2. As shown, the space defined between the pair of the diaphragm plates 14 is generally opened at both ends of the array of the cleaner units 2. The openings may be closed after insertion of the pressure generator 6 through the sockets 20.

The pressure generator 6 includes an elongated body 21 which coextends all sockets 20 in the array of the cleaner units 2. The elongated body 21 generally fits into the sockets 20 in cross section. The elongated body 21 is constructed of a resilient material such as rubber, and includes, therewithin and along the substantially entire length thereof, a pressure passage 8 that is completely filled with a fluid 9. The pressure passage 8 has the same cross section along the entire length thereof, and the two opposing ends thereof are sealed. The fluid 9 may be a gel-like liquid, and completely fills the pressure passage 8. A substantially U-shaped groove 22 is formed in the top surface of the elongated body 21 above the pressure passage 8, and the bottom wall of the groove 22 is formed of a thin resilient wall 7b having a substantially U-shape in cross section, and thus constitutes resiliently deformable support sections 7. The working portions 5 of the scrapers 3 are received by and tightly engaged with the support sections 7. When any of the support sections 7 is deformed, the internal pressure of the pressure passage 8 changes with the fluid 9 shifting. The top thin wall 7b forming the support sections 7 resiliently deforms, but the bottom wall and the side walls of the elongated body 21 are thickened to be rigid and remain undeformed.

In the belt cleaner thus constructed, the mounting bolt 13 of each cleaner unit 2 is rigidly affixed to a support frame 23 (represented by dotted lines in FIG. 4) arranged to face the conveyor belt on the return path thereof, so that the plurality of the cleaner units 2 is arrayed in the transverse direction of the conveyor belt 1. The scraping portions 4 of the scrapers 3 are thus arrayed in a direction perpendicular to the running direction of the conveyor belt 1. The cleaner units 2 communicate with each other through the sockets 20, and the elongated body 21 is inserted from the side opening of the socket 20 at one end until the elongated body 21 coextends the sockets 20 of all cleaner units 2. When the elongated body 21 is inserted through the sockets 20, the working portions 5 of the scrapers 3 are automatically received in the U-shaped groove 22 by a slide motion. As a result, the working portions 5 of the cleaner units 2 are engaged with the corresponding support sections 7 of the elongated body 21. The elongated body 21 thus forms the pressure generator 6. The elongated body 21 is held between the working portions 5 of the scrapers 3 from above and the bottom wall 12b of the base member 12 from below, and is also held from both sides between the foot walls 18 of the pair of the diaphragm plates 14. The elongated body 21 is thus positioned and fixedly held within the sockets 20 without the need for separate fixing means. Since the scrapers 3 are uniformly supported by the support sections 7 of the elongated body 21, the arrayed scraping portions 4 are aligned at the same level in height.

Lift adjustment units, though not shown, are arranged on both sides of the support frame 23. When the support frame 23 is entirely lifted with its horizontal posture kept, the scraping portions 4 of the scrapers 3 of the cleaner units 2 come in contact with the surface of the conveyor belt 1. When the support frame 23 is further lifted thereafter, the scrapers 3 are pushed downward with the diaphragm plates 14 resiliently deformed. The working portions 5 press the support sections 7 to increase the internal pressure of the fluid 9 within the pressure passage 8. Since the fluid 9 imparts uniform pressure to the support sections 7 along with the longitudinally extending pressure passage 8, uniform repellent force is generated on all working portions 5 of all cleaner units 2. As a result, the pressing force of the scraping portions 4 against the belt surface is set to be uniform in all scrapers 3 of all cleaner units 2 under the resilient restoring force of the diaphragm plates 14 and the repelling force of the support sections 7 of the pressure generator 6. When the conveyor belt 1 runs in this state, the leavings stuck onto the surface of the conveyor belt 1 are uniformly scraped across the conveyor belt 1 by the array of the scraping portions 4 and then drop downward. The scraped droppings are guided by the guide walls 16 of the diaphragm plates 14, and fall below the belt cleaner.

FIG. 5 shows the operation of the cleaner units when a particular external force D is applied onto any of the cleaner units 2 from the conveyor belt 1. For convenience, the cleaner unit on which the external force D acts is labeled a reference number suffixed with the letter "a" to discriminate it from the remaining cleaner units. Although the support section 7 longitudinally extends along with the elongated body 21, the support section 7 functionally responds to each scraper 3, and each portion of the support section 7 corresponding to each scraper 3 is individually labeled reference numeral 7. The support section, corresponding to the scraper 3a on which the external force D acts, is labeled reference numeral 7a. When the downward external force D is applied from the conveyor belt 1 to the scraping portion 4a of the scraper 3a in the cleaner unit 2a, the working portion 5a of the scraper 3a pushes down the resilient support section 7a engaged therewith, thereby inwardly deforming the pressure passage 8. Since the internal pressure of the fluid 9 within the pressure passage 8 is thus increased, the pressure P of the fluid 9 pushes upward the other resilient support sections 7 corresponding to the remaining cleaner units 2, thereby deforming the support sections 7 outwardly. As a result, the scrapers 3 of the remaining cleaner units 2 are raised upward with the working portions 5 pushed up by the support sections 7. The pressing force U of the scraping portions 4 against the belt surface is thus increased. Throughout the cleaner unit 2a under the external force D and the remaining cleaner units 2, the pressing force of the scraping portions 4a and 4 of all scrapers 3a and 3 remains uniform against the belt surface.

In another embodiment of the present invention, the base member 12 may be formed to be curved in an arcuate configuration, and the array of the cleaner units 2 may be arranged along the arcuate configuration, and a similarly arcuate pressure generator 6 may be arranged. This arrangement may be implemented in the arcuate belt cleaner disclosed in U.S. Pat. No. 4,836,356. The present invention is not limited to the above embodiment, and changes and modifications are possible without departing from the spirit and scope of the appended claims.

What is claimed is:

1. A belt cleaner comprising an array of a plurality of cleaner units (2) to be arranged in the transverse direction of a conveyor belt on a vertically movable support frame (23), and pressure generator (6) combined with the cleaner units (2):

each of said cleaner units (2) including a scraper (3) supported movably in the direction of forward and backward with respect to the surface of the conveyor belt, a scraping portion (4) at the top of the scraper (3) to be brought into contact with the belt surface, and a working portion (5) at the bottom of the scraper (3); and said pressure generator (6) including a plurality of support sections (7) which are respectively engaged with the corresponding working portions (5) of the cleaner units (2) to integrally move with the forward and backward motion of the scrapers (3), a pressure passage (8) for causing the support sections (7) to communicate with each other, and a fluid (9) filled in the pressure passage (8); said pressure passage (8) being enclosed and completely filled with the fluid (9); whereby pressing forces of the scraping portions (4a, 4) of all scrapers (3a, 3) are kept uniform against the belt surface in such a manner that when the inner pressure of the pressure passage (8) is increased with any one of the support section (7a) pressed by the corresponding scraper (3a), the other support sections (7) push up the corresponding working portions (5) of the scrapers (3).

2. A belt cleaner according to claim 1, wherein each cleaner unit (2) includes resilient means (14) for resiliently supporting the scraper (3) movably in the direction of forward and backward with respect to the belt surface, and a socket (20) provided in the resilient means (14) under the working portion (5) so that the sockets (20) extend through the array of the cleaner units (2); wherein the pressure generator (6) comprises an elongated body (21) that extends through the sockets (21) communicating through the arrayed cleaner units (2), the elongated body (21) includes a resilient wall (7b) which extends along the pressure passage (8) and is resiliently deformable in response to a change in the internal pressure of the pressure passage (8), the resilient wall (7b) is engaged with the working portions (5) of the scrapers (3) to constitute the support sections (7).

3. A belt cleaner according to claim 2, wherein the elongated body (21) of the pressure generator (6) has the length substantially equal to the total length of the array of the cleaner units (2), and the resilient wall (7b) is formed of the top wall of the elongated body (21), while the bottom wall and the side walls of the pressure passage (8) are rigid and are not deformed even when the internal pressure of the pressure passage (8) changes, the resilient wall (7b) becomes engaged with the working portions (5) of the scrapers (3) when the elongated body (21) is inserted into the sockets (20) extending through the array of the cleaner units (2).

4. A belt cleaner according to claim 3, wherein each cleaner unit (2) includes a pair of diaphragm plates (14) formed of resilient members which clamp the scraper (3) therebetween and resiliently support the scraper (3) movable in the direction of forward and backward with respect to the belt surface, and the socket (20) is arranged under the working portion between the pair of diaphragm plates (14) so that the sockets (20) extend through the array of the cleaner units (2).

5. A belt cleaner according to claim 4, wherein the pair of the diaphragm plates (14) respectively comprise guide walls (16) having tapered portions inclining gradually apart from each other downwardly from top attaching portions (15) secured to both sides of the scraper (3), neck walls (17) inwardly curved from the respective guide walls (16), and foot walls (18) vertically extending from the respective neck walls (17); wherein said foot walls (18) are secured to both sides of a base member (12) to form the socket (20) between the foot walls (18) on the base member (12), and the scraper (3) is supported by the resilient deformation of the neck walls (17) in a vertically movable fashion.

6. A belt cleaner according to claim 5, wherein the base member (12) comprises a channel-like member upwardly opened which includes a base portion (12b) to which a mounting bolt (13) is attached, and a pair of channel walls (12a) vertically standing from both sides of the base portion (12b); wherein the pair of the foot walls (18) of the cleaner unit (2) are respectively secured to the channel walls (12a).

7. A belt cleaner according to one of claims 2 through 5, wherein the working portion (5) of the scraper (3) comprises a rail-like member (5b) having a semi-circle in cross section, and a groove (22) is formed in the top surface of the elongated body (21) to provide the resilient wall (7b) having a thin thickness and a substantially U-shaped cross section defined by the groove (22); wherein the working portion (5) is received in the groove (22).

* * * * *